United States Patent [19]
Gallant et al.

[11] Patent Number: 4,805,274
[45] Date of Patent: * Feb. 21, 1989

[54] REMOTE CONTROL FOR ADJUSTABLE-CURVATURE ROLL

[75] Inventors: James O. Gallant, Dighton, Mass.; Thomas E. Pitts, Warren, R.I.

[73] Assignee: SW Industries, Inc., Providence, R.I.

[*] Notice: The portion of the term of this patent subsequent to Nov. 17, 2004 has been disclaimed.

[21] Appl. No.: 865,109

[22] Filed: May 20, 1986

Related U.S. Application Data

[63] Continuation-in-part of Ser. No. 822,490, Jan. 21, 1986, abandoned.

[51] Int. Cl.$^4$ .............................................. D06C 3/06
[52] U.S. Cl. .................................................... 26/104
[58] Field of Search .................. 26/101, 102, 103, 104; 29/116 R, 116 AD; 198/824

[56] References Cited

U.S. PATENT DOCUMENTS

| | | |
|---|---|---|
| 2,689,392 | 9/1954 | Robertson . |
| 2,898,662 | 8/1959 | Robertson . |
| 3,266,743 | 8/1966 | Moser et al. .............. 26/104 X |
| 3,389,450 | 6/1968 | Robertson . |
| 3,500,524 | 3/1970 | Jagminas . |
| 3,665,572 | 5/1972 | Robertson . |
| 3,783,481 | 1/1974 | Gallant . |
| 3,838,480 | 10/1974 | Depuy . |
| 3,940,043 | 2/1976 | Staples .............................. 26/101 X |
| 4,012,821 | 3/1977 | Feaster . |
| 4,410,122 | 10/1983 | Frye et al. ......................... 26/102 X |
| 4,706,349 | 11/1987 | Gallant .................................. 26/104 |

FOREIGN PATENT DOCUMENTS 2335291 2/1974 Fed. Rep. of Germany ........ 26/104

Primary Examiner—Robert R. Mackey
Attorney, Agent, or Firm—Lorusso & Loud

[57] ABSTRACT

Disclosed is a remotely-controlled adjustable-curvature roll of the present invention which includes a hollow, cylindrical axle in which two rods are inserted. Each of the rods is securely fastened to an endplate at one end of the axle, and the opposite end of each rod is threaded within one of two oppositely rotating intermeshed gears. An air-impact motor is connected to one of the meshed gears to rotate the gear to which it is connected. The rotation of the gears in one direction causes an increase in the compression applied to one of the rods while at the same time exerting an increased tension on the other rod which is connected to the oppositely rotating gear. This combination of tension and compression causes the curvature of the roll to change. A remote control unit regulates the flow of air from an air supply to the air-impact motor. The remote control unit includes a filter for filtering the air supply and an oil mist lubricator for adding a lubricant to the air supply. An indicator included in the remote control unit provides a reading of the amount of bow in the roll. The axle may be surrounded by an outer sleeve which rotates, through the aid of ball bearings, around the axle.

22 Claims, 8 Drawing Sheets

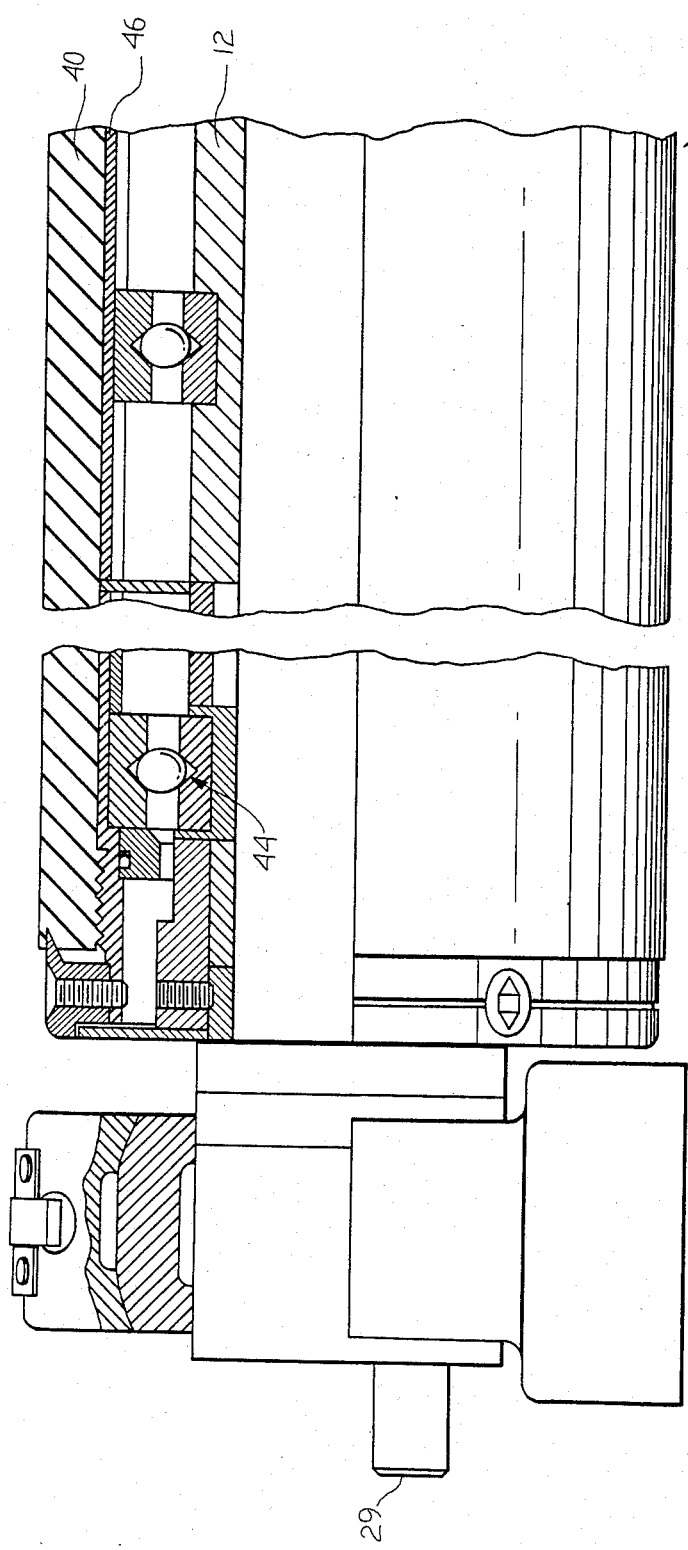
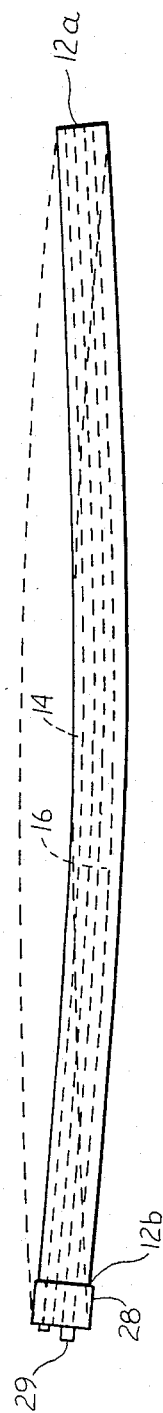
FIG. 2
FIG. 1

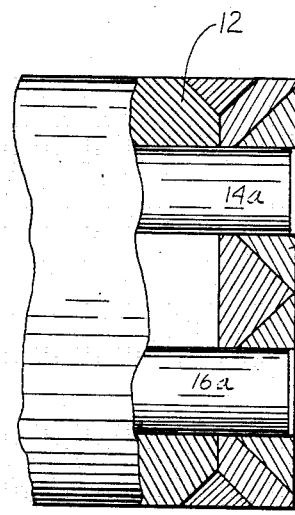
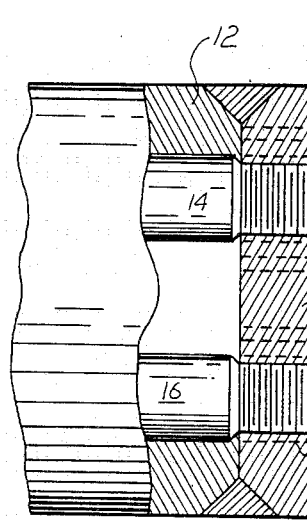
FIG. 7A    FIG. 7B
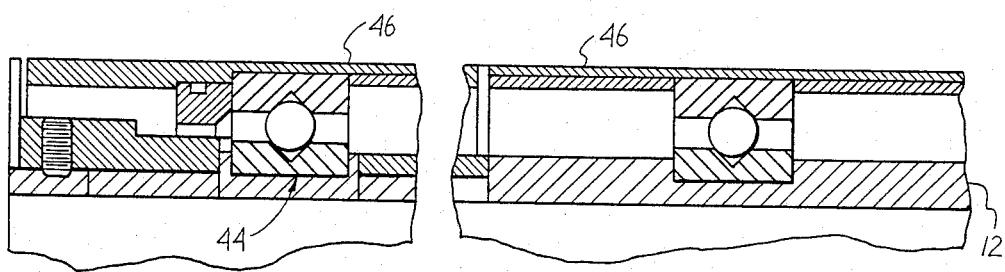
FIG. 8

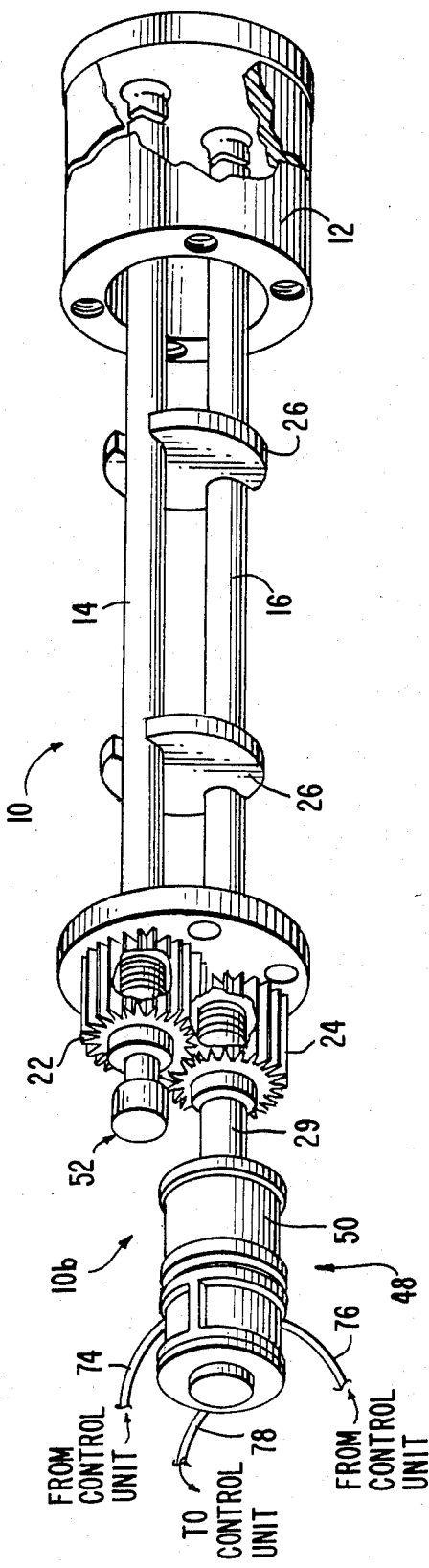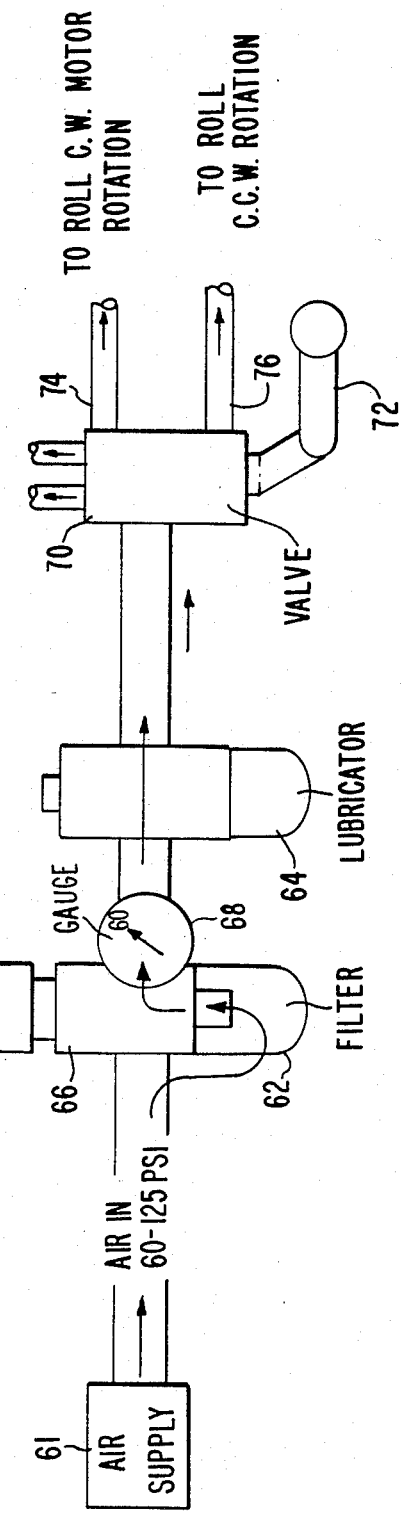

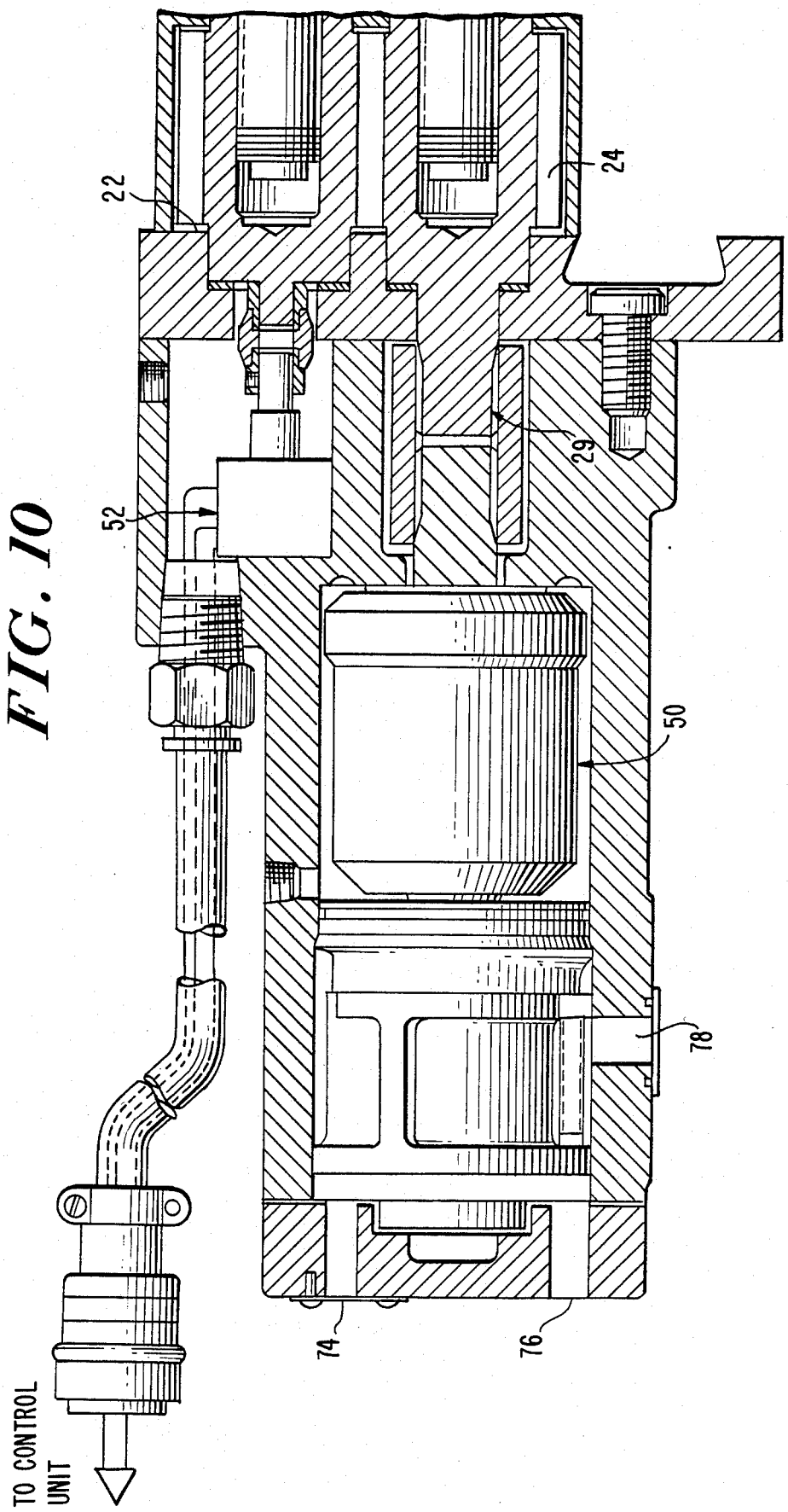

REMOTE CONTROL FOR ADJUSTABLE-CURVATURE ROLL

CROSS REFERENCE TO RELATED APPLICATIONS

This application is a continuation-in-part application of U.S. patent application Ser. No. 822,490 filed Jan. 21, 1986 for an "Adjustable Curvature Roll" in the name of James O. Gallant, now abandoned.

BACKGROUND OF THE INVENTION

The present invention relates to curved rolls or bars useful in the control of flexible sheet or web materials, and more particularly to curved rolls or bars, the radius of curvature of which is adjustable by remote control. The present invention also relates to straight rolls or bars which may be adjustably curved in opposite directions in a single plane by remote control.

Longitudinally curved rolls or bars of a type whose degree of curvature is adjustable have found wide use for the lateral spreading and expansion of sheet materials such as cloth, paper, foil, plastic film, webs of tire cord and the like, both to control the width of the material and to remove wrinkles. Such rolls or bars are also used for correcting bow distortions of the weft threads of woven goods or the courses of knit goods. Although in many applications curved rolls or bars having a fixed degree of curvature or bow are satisfactory, it is often necessary or desirable to provide means for changing the curvature of the roll or bar in order to obtain better control of the processing under varying conditions.

In known rolls, it has proven to be advantageous to incorporate a tension and a compression member within a centrally positioned axle of the roll. In U.S. Pat. No. 3,838,480 a solid axle is split, and a threaded screw-like adjusting means applies tension to one split portion of the axle and compression to another portion of the axle which lies on the opposite side of a neutral bending axis of the axle. The equally applied tension and compression causes a change in the curvature of the axle. Rolls having one piece, split axles have a number of shortcomings. First, the bending force is not evenly distributed across the axle. Also, if either the tension or compression member breaks, the entire axle must be rebuilt, and the cost of the construction is high.

In other known adjustable deflection rolls, such as the roll of U.S. Pat. No. 3,500,524, a compression member and a tension member are snugly fit within a hollow, circular, straight cylindrical axle. The two members extend lengthwise within the axle, and they meet on a neutral axis of transverse bending of the axle. The two members are longitudinally slidable relative to one another and to the axle. When the curvature of the roll is adjusted, the member being compressed lies on the convex side and the member which is in tension lies toward the concave side. To adjust the tension and compression members, two adjusting screws for each member—one located at each end of a member—are rotated by an amount appropriate to provide the necessary compression and tension. This roll, however, is not a bowed roll. Rather it is a straight roll which deflects, and in operation the roll will attempt to return to a straight position. Such rolls, also only adjust in one direction, and they cannot reverse the direction.

Adjustable deflection rolls of the type described in U.S. Pat. No. 3,500,524 also have a number of shortcomings. First of all, screws must be adjusted on both ends of the roll, and therefore, clearance must be left on both sides of the rolls. Such a need for clearance prevents the rolls from being used in certain tight environments, and in fact, most web processing machines have only a single "tending" side from which adjustments are made. Secondly, the increased length imposes difficulties and limitations where such rolls are required to be mounted between the frames of an existing machine. Thirdly, the two screws must be rotated by an equally opposite amount, and the accuracy of such adjustment will never be perfect. Finally, the roll can only be adjusted in one direction from a straight or curved condition, and this limits maximum adjustment to only 50% of what could be achieved with the same elements with adjusting force reversal.

Adjustable curvature rolls currently available utilize a means of adjustment which is located directly on the roll and must be manually adjusted. When rolls are situated in locations that do not allow much clearance on either end of the roll, adjustment proves to be difficult and time consuming. In addition, manual adjustment of a roll may require special tools, and great care must often be taken in order to precisely adjust the curvature of the roll. Moreover, manually adjustable rolls do not generally provide a meaningful reading of the degree of curvature of the roll.

It is therefore a principal object of the present invention to provide an adjustable-curvature roll or bar utilizing separate tension and compression members inserted in a hollow, cylindrical axle, the curvature of which can be remotely, accurately, and reliably adjusted in both directions from a neutral position.

It is a further object of the present invention to provide an adjustable-curvature roll having separate tension and compression members, both of which are actuated by a remotely controlled adjusting means.

It is a still another object of the present invention to provide a means for accurately displaying the actual amount of bow in an adjustable curvature roll.

SUMMARY OF THE INVENTION

The adjustable-curvature roll of the present invention includes a hollow, cylindrical axle in which a tension and a compression rod are inserted. Each of these rods is securely fastened to an endplate at one end of the axle, and the opposite end of each rod is threaded within one of two oppositely rotating intermeshed gears. A remotely controlled adjusting device is connected to one of the meshed gears, and causing the adjusting device to rotate the gears in one direction causes an increase in the compression applied to one of the rods while at the same time exerting an increased tension on the other rod which is connected to the oppositely rotating gear. The adjusting device can also be rotated in the opposite direction to decrease the compression applied to one of the rods and to decrease tension on the other rod. This combination of a change in tension and compression causes the curvature of the roll to change.

The remotely controlled adjusting device in one embodiment is an impact type air motor similar to the motors used in air impact wrenches. The air impact motor output shaft is connected to one of the two rotating intermeshed gears. The motor in turn is connected to a remotely situated unit which controls the operation of the motor and hence the curvature of the roll. The remotely situated unit also preferably includes a digital readout of the precise amount of curvature of the roll.

This readout is based on the amount of rotation of one of the gears connected to one of the rods.

The axle is surrounded by a rotatable outer surface which rotates, through the aid of ball bearings, around the axle. The purpose of the axle is to provide a control of the contour of the rotatable outer surface of the roll. The term "roll" is intended to describe the assembly of the "axle" and the "rotatable outer surface". In some embodiments, the "rotatable outer surface" may be a series of rigid cylindrical spools or cylinders. In other embodiments, the "rotatable outer surface" is a rubber sleeve.

These and other features and objects of the present invention will be more fully understood from the following detailed description which should be read in light of the accompanying drawings in which corresponding reference numerals refer to corresponding parts throughout the several views.

BRIEF DESCRIPTION OF THE DRAWINGS

FIG. 1 is a simplified plan view of the adjustable-curvature roll of the present invention without the remotely controlled adjusting mechanism;

FIG. 2 is a view, partly in perspective, partly in section, of a portion of the adjustable-curvature roll shown in FIG. 1;

FIG. 7a is a sectional view of one end of the axle of the adjustable-curvature roll of FIG. 1;

FIG. 7b is a sectional view of an alternate embodiment of one end of the axle of the adjustable-curvature roll of FIG. 1;

FIG. 8 is a sectional view of the outer surface of an alternate embodiment of the roll shown in FIG. 2;

FIG. 9 is a perspective view of the roll shown in FIG. 3 with the remotely controlled adjusting mechanism of the present invention attached to one end of the roll;

FIG. 10 is a sectional view of the end of the curved roll shown in FIG. 4 with a remotely controlled adjusting mechanism attached thereto;

FIG. 11 is a schematic view of the elements of a remote control unit for controlling the operation of the adjusting mechanism shown in FIG. 10;

DETAILED DESCRIPTION OF THE PREFERRED EMBODIMENTS

Figure 3:
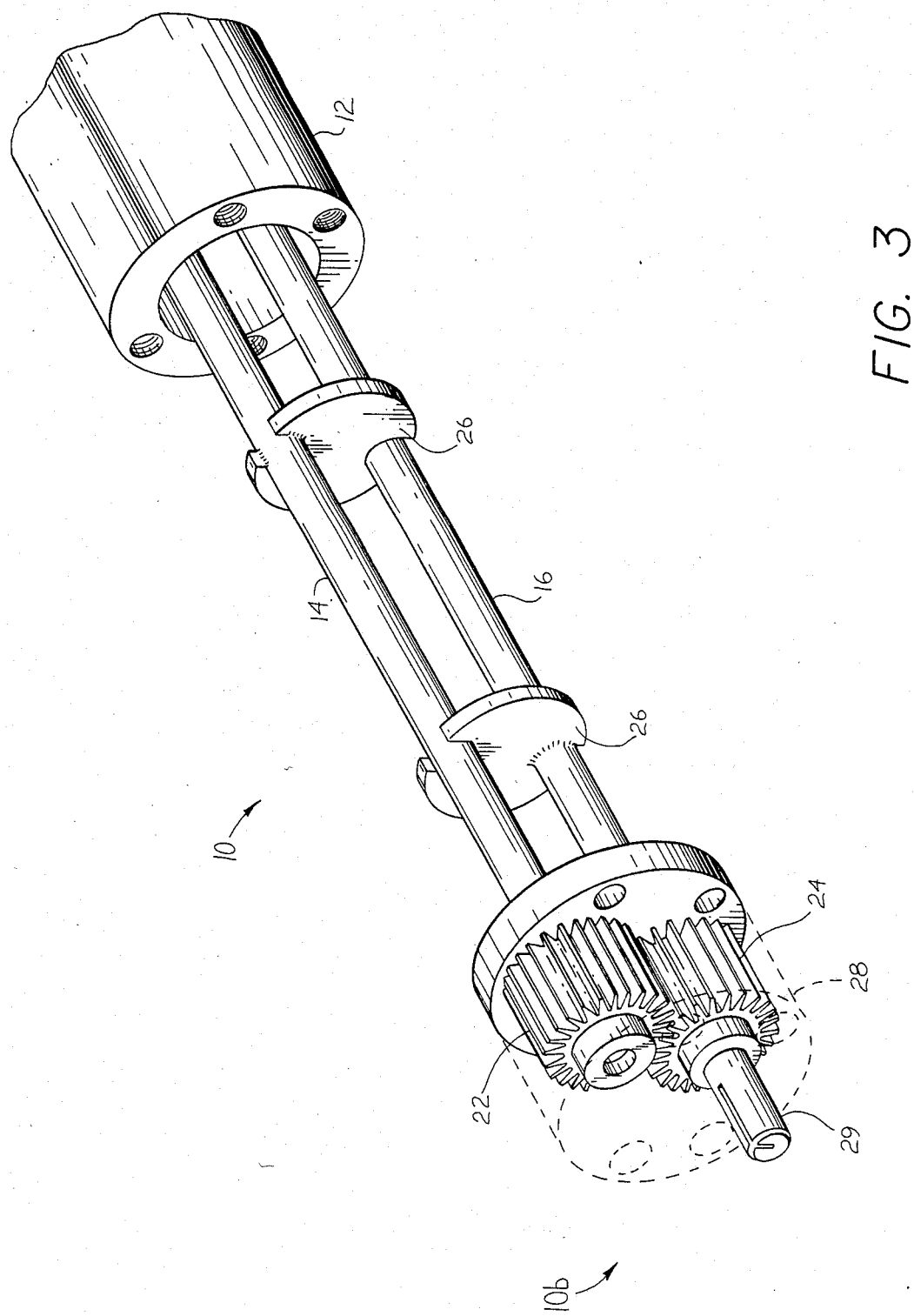
FIG. 3 is an exploded perspective view of a portion of the axle of the adjustable-curvature roll shown in FIG. 1.

As shown in FIGS. 1-3, the improved roll 10 of the present invention includes a longitudinally-curved hollow axle 12 in which two rods 14, 16 are mounted. The axle 12, while in use, has an arcuate configuration, and may be covered with a rotating rubber sleeve 40 as described below. As constructed, the axle 12 may be either curved or straight.

As shown in FIGS. 7a and 7b, each of rods 14, 16 are secured to one end 12a of the axle 12. In the embodiment of FIG. 7a, each end 14a, 16a of rods 14, 16, respectively, are welded to an end plate 18 of the axle 12. In the alternate preferred embodiment shown in FIG. 7b, threaded bushings 19 mounted inside the end plate 18 receive the rods 14, 16 through threads 20. This alternate embodiment allows the rods 14, 16 to be unscrewed thereby avoiding the necessity of cutting open the roll to gain access to the rods.

Figure 4:
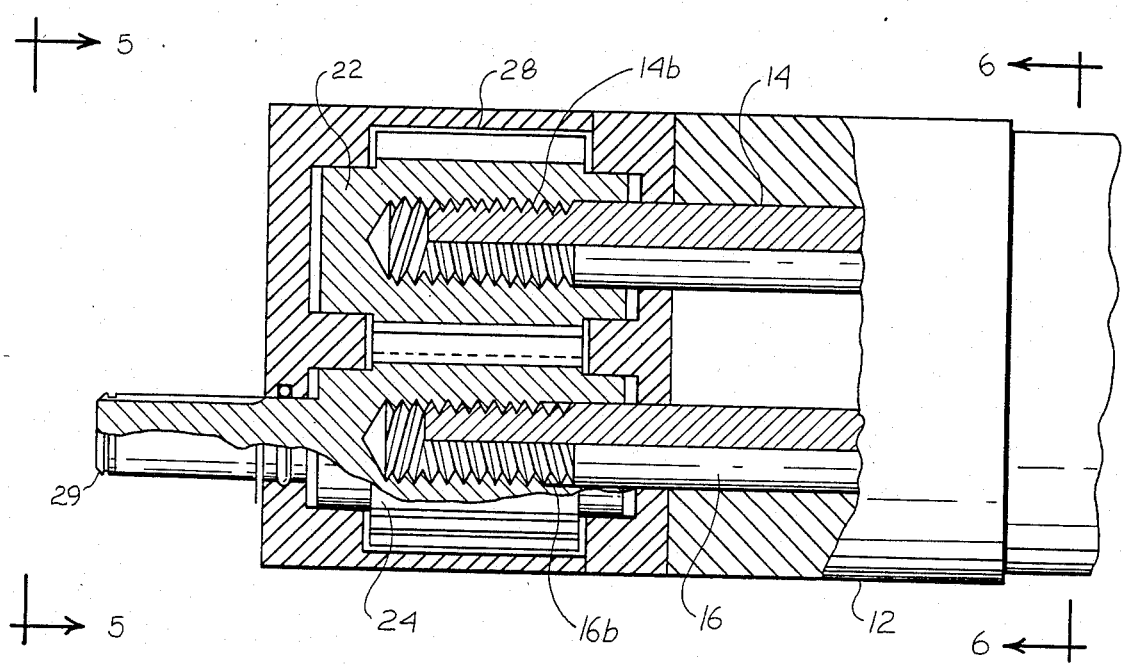
FIG. 4 is a sectional view of one end of the curved roll shown in FIG. 1.
Figure 5:
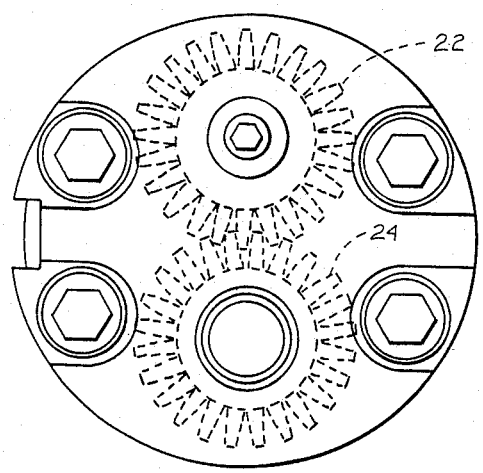
FIG. 5 is a view taken along lines 5—5 of FIG. 4.
Figure 6:
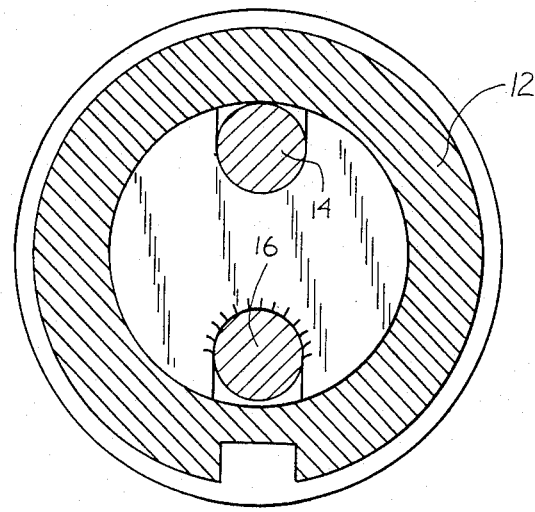
FIG. 6 is a view taken along lines 6—6 of FIG. 4.

As shown in FIGS. 3 and 4, the opposite ends 14b, 16b of rods 14, 16, respectively, are threaded into two oppositely rotating, mating, spur gears 22, 24. The rods themselves do not rotate and the spur gears 22, 24 have internal threads which accept the external threads on ends 14b, 16b of rods 14, 16. The threading of the rods 14, 16 into the gears 22, 24 allows the engaging of the rods in a manner sufficient to produce the necessary counteracting forces of tension and compression. The two rods 14, 16 are separated from each other along their lengths by appropriately positioned spacers 26 which reduce the unsupported span of the rods 14, 16 to a safe limit which will not allow buckling of the rods when curvature of the roll is increased or decreased. The spacers 26 are preferably welded to these rods so that every other spacer is welded to rod 14 and the spacers not welded to rod 14 are welded to rod 16.

As shown in FIGS. 2-4, the roll 10 has an elongated neck which houses the gears 22, 24. A remotely controlled adjusting device, not shown in FIGS. 2-4 but shown in FIGS. 9-10, 15 attached on the exterior of housing 28 to a splined extension shaft 29 of gear 24. As the remotely controlled adjusting device applies torque to gear 24 in a manner described below, gear 24 rotates in one direction and gear 22 will rotate in the opposite direction. As stated above, the rods do not rotate, and therefore, the rotating of gear 24 in one direction causes the pushing of rod 16 relative to end 12a of the axle 12. At the same time, rod 14 is pulled relative to end 12a of the axle 12. When a rod is pulled it is put under tension, and when a rod is pushed it is compressed. When the gear 24 is rotated in the opposite direction, the pushing of rod 16 and the pulling of rod 14 is reduced or even reversed.

The terms "pushing and pulling" are not necessarily used in their ordinary sense here. When the roll is in use, one rod is under compression and the other rod is under tension. The pulling of a rod under tension increases the tension and the pulling of a rod under compression reduces the compression rather than actually pulling the rod. Likewise, the pushing of a rod under compression increases the compression and the pushing of a rod under tension reduces the tension rather than actually pushing the rod.

The pushing or pulling of rods 14, 16 results in an adjustment of the curvature of the axle 12 in the following way. As rod 16 is pushed and put under an increased compression it causes the portion of the roll axle in which it lies to undergo tensile strain while the opposite portion of the roll axle is caused to undergo compressive strain by the pulling, and subsequent resulting increased tension, of rod 14. Opposite rotation of gear 24 will reduce both the compression in rod 16 and the tension in rod 14 resulting in an opposite reaction in the axle.

This adjustment of the bow of the roll is technically accomplished by producing equal and opposite force couples at each end 12a, 12b of the axle 12. The couples are actually produced at the ends of the axle 12, but they are projected along the length from both ends of the axle as equal couples. When the couples are applied to the axle they will produce a change in the radius of curvature of the axle, and the change in the radius of curvature will be uniform over the entire length of the axle 12. This roll provides advantages over other known rolls insofar as in known variable curvature rolls there is variation in the radius of curvature closer to the end of the axle where the bowing mechanism is present. Furthermore, the variable curvature roll shown in FIGS. 1-4 has an axle with the same load carrying capacity and the same stiffness in all planes. In known variable curvature rolls, there is a high stiffness in the plane perpendicular to the plane in which the bow is present but in the plane of the bow, the stiffness is approximately one-quarter of the maximum stiffness. As a result in certain applications, one must be very concerned about changing the application of the load from the sheet. If it is in the plane of the roll curvature, the curvature of the axle will change appreciably when a load is applied.

The axle 12 is covered by a rotatable outer surface 20 which may comprise a series of shells 46 as shown in FIG. 8 or a rubber sleeve 40 as mentioned above and shown in FIG. 2 mounted on shells 46. It is this outer surface which contacts the material to be straightened, unwrinkled, etc. Across the surface of the axle 12 are placed a number of rolling bearing elements 44. Cylindrical shells 46 are placed over the bearings and support the interior surface of the sleeve. In this fashion, the sleeve and/or cylindrical shells rotate around the axle without the axle actually rotating.

A remotely controlled adjusting device 48 of the present invention is shown attached to a roll 10 in FIGS. 9-10. An air driven impact motor 50 (such as an impact motor manufactured by Chicago Pneumatic) is integrally mounted at the adjusting end 10b of the roll 10. The motor 50 is connected to the splined extension shaft 29 of gear 24, although any other known means of connecting a motor to a shaft may also be employed. A potentiometer 52 is provided for determining the amount of rotation of the gears 22, 24 to provide a reading of the degree of curvature in the roll.

A remote control unit 60 for operating the adjusting device 48 will now be described with reference to FIGS. 11-13. One of the principal purposes of the unit 60 is to control the flow of air applied to the air motor 50 from an air supply 61. The control unit 60 will typically include a filter 62 which collects miscellaneous dirt and removes some water from the air passing through the filter. An oil mist lubricator 64 adds a small amount of oil to the air to lubricate the air motor parts and to prevent rusting of the motor parts. Air from the air supply 61 generally enters the filter at between 60 and 125 psi and a regulator 66 attached to the filter adjusts the pressure to a preselected value, preferably 60 psi. A gauge 68 is provided so that the air pressure may be visually monitored. A four-way valve 70, controlled by lever 72, operates to govern the air applied to the air motor 50 to thereby increase or decrease the bow in the roll. For example, when lever 72 is pulled, there is an increase in the bow amount and when lever 72 is pushed back toward the display unit, there is a decrease in the bow amount.

The valve 70 controls this increase and decrease in the bow by selectively applying air through an appropriate air line to the air impact motor 50. As shown in FIG. 11, when the valve is in one position, air is supplied to the motor through air line 74 and returns through air line 76 to the valve 70 and then through the valve 70 to the ambient atmosphere. This causes clockwise rotation of the motor 50 which in turn causes a clockwise rotation of the gear 24 and a counterclockwise rotation of the gear 22, thereby increasing the bow in the roll. When the lever 72 is pushed, air is supplied to the motor through the air line 76 and air line 74 acts as the return line so that air is supplied to the air motor 50 in a manner which will cause a counterclockwise rotation of the air motor 50 which in turn results in a counterclockwise motion of the gear 24 and a clockwise motion of the gear 22 thereby resulting in a decrease in the bow of the roll. A supplementary point of discharge of air from the motor 50 is also provided to increase motor power and efficiency. This exhaust is common for both directions of motor rotation so that the air can discharge directly from the motor 50 to the ambient atmosphere. Such an open line, however, might allow the motor 50 or line 78 to be contaminated by the wet, dirty atmosphere at the roll end. Therefore, air line 78 is brought back to the remote control unit 60 where the atmosphere is clean.

The housing 79 for remote control unit 60 of the present invention is preferably a corrosion-resistant, sealed enclosure which is designed to provide convenient bow adjustment and long, trouble-free operation. The housing 79 is suitable for wet and dry enviornments and ambient temperature up to 160° F. As described above, the filter 62 and lubricator 64 also assure trouble-fee operation of the air motor 50 which drives the bow-adjusting mechanism 48. The regulator provides a controlled air pressure for uniform operation of the air motor in spite of variations in the pressure of the mill air.

Another principal feature of the present invention is an automatic bow display 80 which shows the actual amount of bow in the roll. The display is preferably a LCD-type (liquid crystal display). The circuitry shown in FIG. 13, is provided to read the position of the rotary potentiometer 52 which is connected to gear 22. The potentiometer 52 is calibrated to make the display read out the actual bow in the roll in inches (or any other predetermined units) based on the resistance of the potentiometer 52 in the end of the roll. Standard long-life batteries are utilized to make the apparatus as maintenance free as possible. An indicator 82 on the display 80 blinks when the operating limit of the bow adjustment is reached. This light is provided to alert the operator to the normal limits so that he will not try to adjust the roll further. Another indicator is preferably provided to indicate when the batteries should be replaced.

Figure 12:
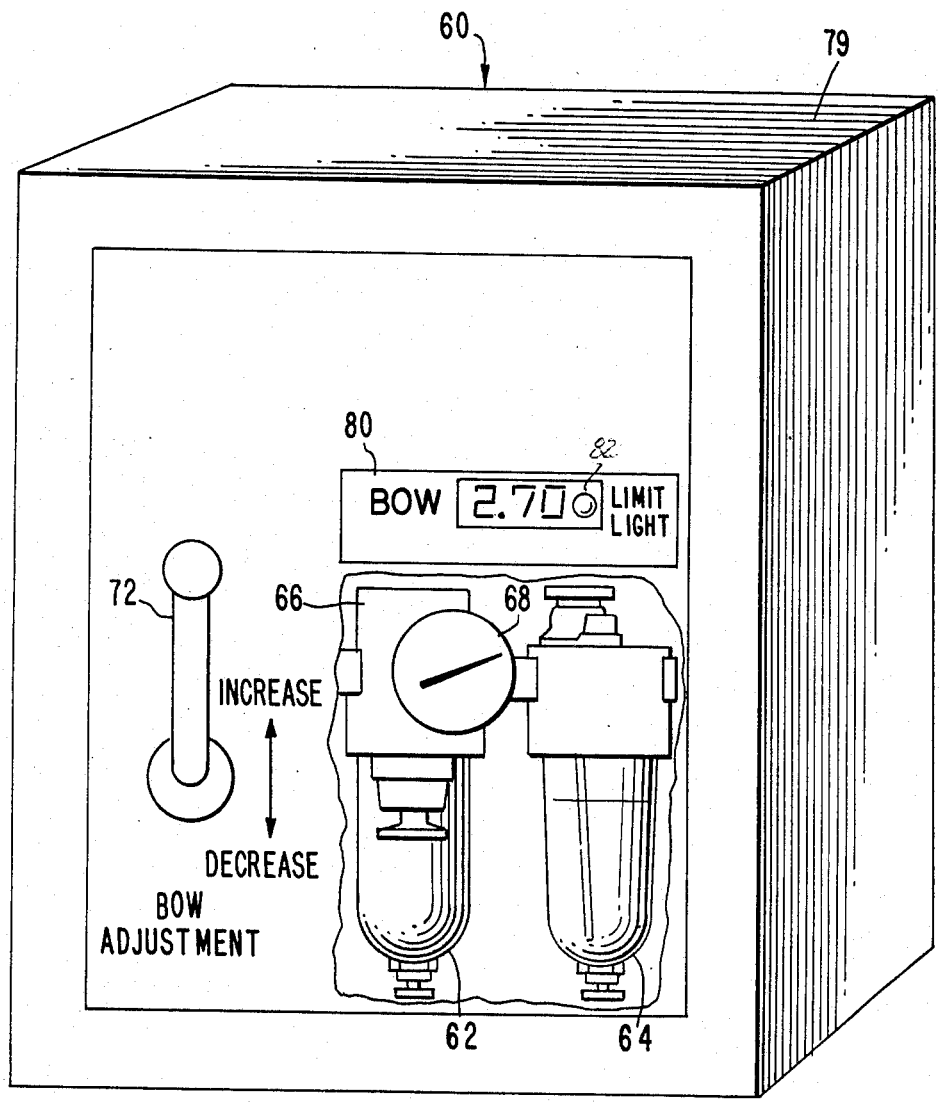
FIG. 12 is a perspective view of the front of the housing for the control unit for the adjusting mechanism shown in FIG. 9.
Figure 13:
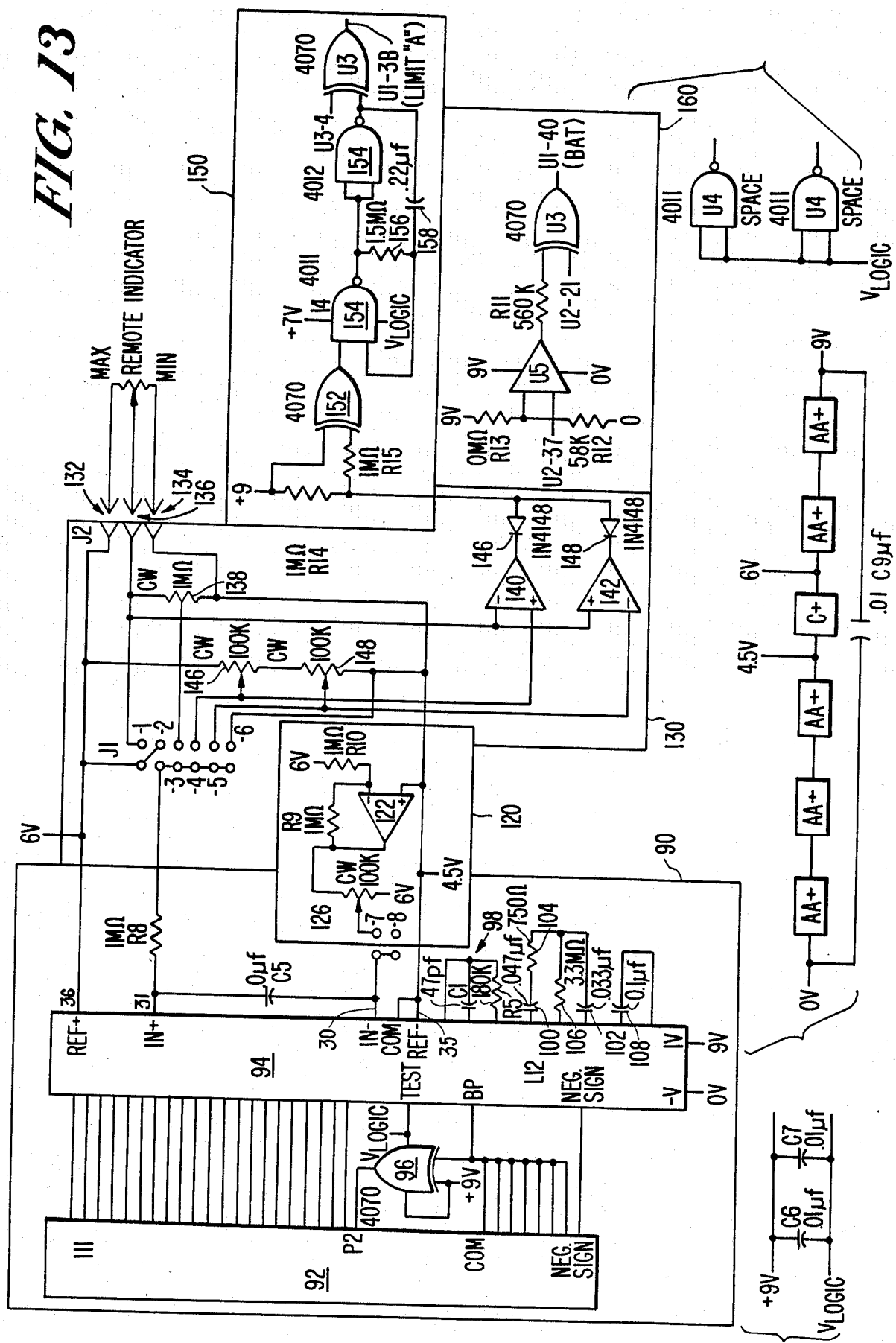
FIG. 13 is a schematic diagram of the digital bow readout and warning circuitry of the remote control unit shown in FIG. 11.

Referring to the circuit for operating the bow indicator display 80 of FIG. 12, the visual display circuitry 90 includes a standard liquid crystal display 92 such as obtainable from the Amperex Corporation under designation LC703831-300.28/IE. A converter chip 94 is provided to enable an analog-to-digital conversion of the bow signal to thereby operate the liquid crystal display 92. A suitable converter chip is that sold by Intersil under the designation ICL7126CPL. Such a chip has the principal advantage that it has low power requirements. RC circuit 98 is provided to set the frequency of an internal oscillator that controls the internal timing of the converter 94, and the converter utilizes capacitors 100, 102 and resistors 104, 106 to form an integrator which is used to perform the conversion. Capacitor 108 stores the reference voltage during the conversion. The convertor measures the voltage across its input pins 31 and 30 and compares it to the reference voltage across its pins 36 and 35. If the voltages are equal, the converter will display 9.99. If the input voltage is one-half of the reference voltage, the display would be 5.00. Capacitor C5 and resistor R8 provide low pass filtering to eliminate noise that would cause a display to "jump" around. Gate 96 drives the fixed decimal point.

The circuit section labelled 120 generates an adjustable offset needed for calibrating the indicator unit 80. The operational amplifier 122 generates a voltage that is equal to $-V_{ref}$. This voltage is available at the output of the operational amplifier 122. By adjusting resistor 126 any voltage between $V_{ref}$ and $-V_{ref}$ can be sent to the output of the circuit section 120. The operational amplifier 122 and related circuitry allows the offset voltage to track the reference voltage as the batteries wear down, and as a result the displayed value will not change as the batteries die.

The circuit section 130 is provided to generate the signals necessary to measure the bow and the limits. The reference voltage +6V generated by the battery is connected to terminal 132 and 134. A fraction of that voltage is returned at terminal 136 and placed across resistor 138. This voltage is also inputted to amplifiers 140, 142. The potentiometer 138 scales the input depending on the sensitivity needed for a particular bow roll. Potentiometers 146, 148 generate plus and minus limit values. When either of these limits are exceeded by the value across terminal 136, one of the amplifer outputs goes low causing the common point of diodes 146, 148 to switch from +9V to 0V.

In the circuit section labelled 150, the outer limit signal is detected from circuit section 130 in order to cause the limit signal on the display to blink. Gate 152 enables an oscillator comprising gates 154, resistor 156 and capacitor 158. When enabled, the oscillator causes the limit signal to blink.

Circuit section portion 160 monitors the overall 9V battery voltage. When this voltage drops below a preset value the battery signal will become visible on the display. At this point, there is still some life left in the batteries, but they should be replaced as soon as possible.

While the foregoing invention has been described with reference to its preferred embodiments, it should not be limited to such embodiments since various alterations and modifications will occur to those skilled in the art. For example, any adjusting mechanism that can be mounted to remotely rotate a gear may be employed. Furthermore, other types of control may be utilized provided they can stop and start the operation of adjusting mechanism. The remote control unit can also be operated automatically rather than manually. In such a situation, a solenoid valve could replace the four-way valve 70, and the solenoid valve would be operated by a central control until a preset valve of bow is achieved. All such variations and modifications are intended to fall within the scope of the appended claims.

What is claimed is:

1. In an adjustable curvature roll including an axle having a hollow cylindrical body, an outer sleeve having an inner circumference greater than the outer circumference of said axle, said sleeve rotatably mounted around said axle, two longitudinally extending rods inserted within said hollow, cylindrical body, a first end of said rods being secured to an end plate at a first end of said axle, the improvement comprising:

a remotely controllable means for applying a tensile axial force to one rod and a compressive axial force to the other rod, said remotely controllable means comprising two intermeshed, oppositely rotating gears, each of said gears being connected to a second end of said rods being opposite said first end of said rods, each of said gears including means to alter the relative axial position between each gear and its connected rod without rotating said rod so as to increase, decrease, or reverse the force exerted on said rods;

remotely controllable means to rotate one of said gears, the rotation of one of said gears causing the rotation of the other of said gears, means for remotely controlling said means for rotating one of said gears.

2. The improved adjustable curvature roll of claim 1 wherein said remotely controllable means to rotate one of said gears is an air impact motor which is supplied air from a remote source.

3. The improved adjustable curvature roll of claim 2 wherein said means for remotely controlling said means for applying tensile and compressive axial forces comprises a control unit connected to said remotely controllable means through air lines and electrical lines.

4. The improved adjustable curvature roll of claim 3 wherein said control unit regulates the flow of air from an air supply to said air motor.

5. The improved adjustable curvature roll of claim 3 wherein said control unit comprises:
means for filtering air supplied from an an air supply;
means for providing a lubricating mist to said air that has passed through said means for filtering;
adjustable valve means for regulating the flow of air out of said control unit, through said air lines and to said air motor.

6. The improved adjustable curvature roll of claim 1 wherein said means for remotely controlling said means for applying tensile and compressive axial forces comprises a control unit connected to said remotely controllable means.

7. The improved adjustable curvature roll of claim 6 comprising means for displaying an actual measurement of the curvature in said roll on said control unit.

8. The improved adjustable curvature roll of claim 7 wherein said means for displaying an actual measurement of the curvature comprises:
a rotary potentiometer connected to the other of said gears for measuring an amount of rotation of the other of said gears;
means to convert said measurement from said rotary potentiometer into a readable display.

9. The improved adjustable curvature roll of claim 8 wherein said means to convert said measurement converts said measurement into a digital display of the amount of curvature in the roll in standard units.

10. The improved adjustable curvature roll of claim 6 further comprising warning means for indicating on said control unit when the roll has reached a curvature limit.

11. The improved adjustable curvature roll of claim 6 wherein said control unit is battery powered and further comprising means for indicating on said control unit that said batteries powering said control unit are at a low power level.

12. An adjusting apparatus for an adjustable curvature roll which includes an axle having a hollow, cylindrical body, an outer sleeve having an inner circumference greater than the outer circumference of said axle, said sleeve rotatably mounted around said axle, two longitudinally extending rods inserted within said hollow cylindrical body with a first end of said rods being secured to an end plate at a first end of said axle, said adjusting apparatus comprising:
  a remotely controllable means for applying a tensile axial force to one rod and a compressive axial force to the other rod, said remotely controllable means comprising two intermeshed, oppositely rotating gears, each of said gears being connected to a second end of said rods being opposite said first end of said rods, each of said gears including means to alter the relative axial position between each gear and its connected rod without rotating said rod so as to increase, decrease, or reverse the force exerted on said rods;
  remotely controllable means to rotate one of said gears, the rotation of one of said gears causing the rotation of the other of said gears,
  means for remotely controlling said means for rotating one of said gears.

13. The adjusting device of claim 12 wherein said remotely controllable means to rotate one of said gears is an air impact motor which is supplied air from a remote source.

14. The adjusting device of claim 13 wherein said means for remotely controlling said means for applying tensile and compressive axial forces comprises a control unit connected to said remotely controllable means through air lines and electrical lines.

15. The adjusting device of claim 14 wherein said control unit regulates the flow of air from an air supply to said air motor.

16. The adjusting device of claim 14 wherein said control unit comprises:
  means for filtering air supplied from an an air supply;
  means for providing a lubricating mist to said air that has passed through said means for filtering;
  adjustable valve means for regulating the flow of air out of said control unit, through said air lines and to said air motor.

17. The adjusting device of claim 12 wherein said means for remotely controlling said means for applying tensile and compressive axial forces comprises a control unit connected to said remotely controllable means.

18. The adjusting device of claim 17 comprising means for displaying an actual measurement of the curvature in said roll on said control unit.

19. The adjusting device of claim 18 wherein said means for displaying an actual measurement of the curvature comprises:
  a rotary potentiometer connected to the other of said gears for measuring an amount of rotation of the other of said gears;
  means to convert said measurement from said rotary potentiometer into a readable display.

20. The adjusting device of claim 19 wherein said means to convert said measurement converts said measurement into a digital display of the amount of curvature in the roll in standard units.

21. The adjusting device of claim 17 further comprising warning means for indicating on said control unit when the roll has reached a curvature limit.

22. The adjusting device of claim 17 wherein said control unit is battery powered further comprising means for indicating on said control unit that batteries powering said control unit are at a low power level.

* * * * *